United States Patent [19]

McKechnie et al.

[11] Patent Number: 4,679,900
[45] Date of Patent: Jul. 14, 1987

[54] BULK DIFFUSER FOR A PROJECTION TELEVISION SCREEN

[75] Inventors: Thomas S. McKechnie, Ossining; Jill F. Goldenberg, Pelham Manor, both of N.Y.

[73] Assignee: North American Philips Corporation, New York, N.Y.

[21] Appl. No.: 871,009

[22] Filed: Jun. 5, 1986

[51] Int. Cl.⁴ .............................................. G03B 21/60
[52] U.S. Cl. ..................................... 350/126; 350/128
[58] Field of Search ................................. 350/126, 128

[56] References Cited

U.S. PATENT DOCUMENTS

| | | | |
|---|---|---|---|
| 3,614,199 | 10/1971 | Altman | 350/126 X |
| 3,712,707 | 1/1973 | Henkes, Jr. | 350/126 X |
| 3,751,135 | 8/1973 | Claussen et al. | 350/126 X |
| 3,827,783 | 8/1974 | Lemelson | 350/128 X |
| 4,573,764 | 3/1986 | Bradley | 350/128 |

*Primary Examiner*—Richard A. Wintercorn
*Attorney, Agent, or Firm*—Thomas A. Briody; Jack Oisher; William J. Streeter

[57] ABSTRACT

A bulk diffuser for rear projection television screens which exhibits a Gaussian intensity profile. By appropriately selecting the indices of refraction of the substrate and the spheres therein and the range of diameters of the spheres, the intensity half-angle is made equal to the energy half-angle.

7 Claims, 4 Drawing Figures

BULK DIFFUSER FOR A PROJECTION TELEVISION SCREEN

BACKGROUND OF THE INVENTION

The present invention relates to bulk diffusers and, more specifically, to projection television screens which incorporate bulk diffusers therein to control, primarily, the vertical dispersion of the projected light.

Bulk diffusers may be described as including minute spheres embedded in a substrate of a slightly different index of refraction. The spreading characteristics of bulk diffusers are a function of the size and index of refraction of the spheres, the thickness and index of refraction of the substrate, and the loading density of the spheres in the substrate.

Bulk diffusers used in projection television screens are characteristically specified by their intensity half-angle. The intensity half-angle is defined as the angle at which the intensity falls to half the maximum intensity. It has been generally presumed that given a specific intensity half-angle, the intensity profile would be Gaussian. However, this could not explain the appearance of some of the artifacts seen on projection television screens, namely, (1) the picture is visible at much larger angles than the measured intensity half-angle, (2) the solution of the screen is not as high as predicted, and (3) the screen has a lower gain than that predicted.

In a typical projection television screen, the bulk diffuser is specified to be 3 mm. thick and have an 8° intensity half-angle, it being assumed that the intensity profile would be Gaussian. In this typical bulk diffuser, the refractive indices of the spheres and the substrate are 1.53 and 1.49, respectively, the volume ratio of the spheres being equal to 2%, and the spheres having a range in diameters from 5 $\mu$m. to 100 $\mu$m.

In the article "Diffraction Analysis of Bulk Diffusers for Projection Screen Applications", appearing in the Journal of The Optical Society A, December, 1985, applicants disclosed a computer program for analyzing bulk diffusers which assumes that all the spheres have the same diameter. Using this program, the measured intensity half-angle of 8.0°, and the range of diameters 5–100 $\mu$m., an effective sphere diameter is determined as equally 17.3 $\mu$m. (The effective sphere diameter being the single diameter which accurately, within reason, represents the range in diameter of the spheres.) The program may then be used to plot the predicted intensity as a function of angle for this diffuser. This plot is shown in FIG. 1 along with the measured intensity for a sample bulk diffuser. By comparing the predicted and measured results to the curve corresponding to a Gaussian profile, it is clear that the predicted and measured profiles are not Gaussian.

SUMMARY OF THE INVENTION

The object of the present invention is to provide a bulk diffuser for a projection television screen which exhibits a Gaussian profile.

For a diffuser that spreads a collimated beam into a Gaussian beam, the intensity half-angle also corresponds to the angle that encloses half of the energy of the beam, the energy half-angle. Applicants have recognized that while diffusers have been described by the intensity half-angle, it is the energy half-angle that is the important parameter of the bulk diffuser.

The percentage of energy, E($\beta$), enclosed within a given angle can be calculated by:

$$E(\beta) = 100 \left[ \frac{\int_0^\beta I(\beta)\beta d\beta}{\int_0^\infty I(\beta)\beta d\beta} \right],$$

where I($\beta$) is the measured (or predicted) intensity as a function of angle. In accordance with the above formula, the predicted energy half-angle is 13.75° and the measured energy half-angle is 15.58°. With the above bulk diffuser, it was assumed that since the intensity half-angle was 8°, the energy half-angle would be 8°. This discrepancy explains the above-noted artifacts in the projection television screen.

With the above in mind, the method of selecting a bulk diffuser for a projection television screen comprises selecting a desired intensity half-angle, selecting the desired thickness of the bulk diffuser, and determining the effective sphere diameter, the refractive index of the spheres, and the loading of the spheres such that the energy half-angle is substantially equal to the intensity half-angle.

DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENT

Figure 2:
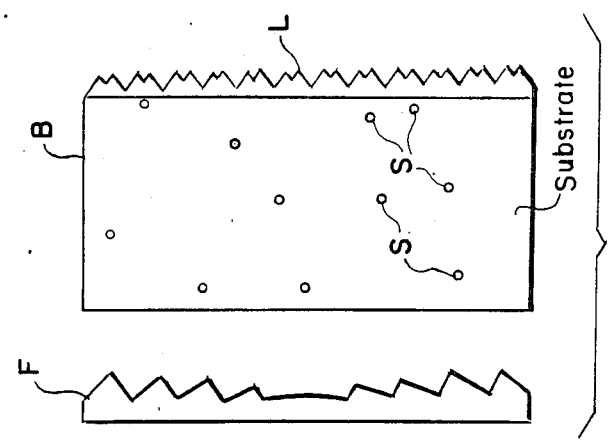
FIG. 2 is a cross-sectional view of a rear projection television screen.

Referring to FIG. 2, a rear projection television screen is shown and includes a Fresnel lens F located opposite a projection light source (not shown). A lenticular lens array L is situated facing an audience viewing field. Arranged between the lenticular lens L and the Fresnel lens F is a bulk diffuser B. This rear projection television screen may be in accordance with U.S. Pat. No. 4,573,764, to which reference may be had for greater detail.

The bulk diffuser B includes a substrate having spheres S uniformly dispersed therein. The spheres S have a slightly greater (or possibly smaller) index of refraction than that of the substrate and as such, are able to diffuse any light passing through the bulk diffuser.

Figure 3:
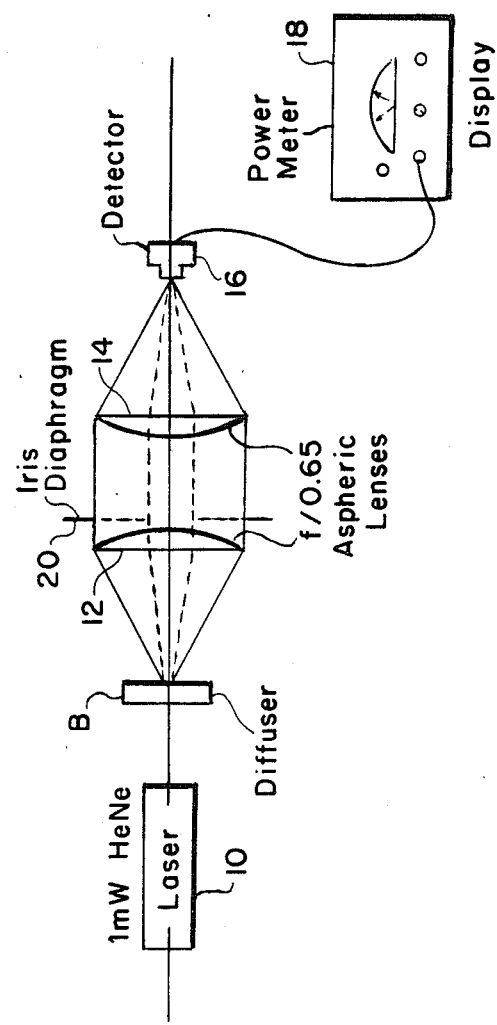
FIG. 3 is a schematic diagram of a test arrangement for measuring the energy half-angle of a diffuser.

While the energy half-angle E($\beta$) may be determined by using the above formula, applicants have developed an arrangement for directly measuring the energy half-angle E($\beta$). As shown in FIG. 3, a low-power HeNe laser 10 generates a light beam which passes through the bulk diffuser B. All the light is collected and collimated by lens 12. Lens 14 focuses this light onto a detector 16. A power meter 18 connected to the detector 16 then gives a direct reading of the total energy in the diffused light beam. An iris diaphragm 20 situated at the exit of lens 12 is then stopped down until the meter registers half of the total energy of the light beam. The energy half-angle is then calculated by:

$$E = \sin^{-1}\left[\frac{d}{2f}\right],$$

where d is the diameter of the iris diaphragm 20 corresponding to the half energy level, and f is the focal length of lens 12; d may be measured with calipers.

When aligning the system, it is important that the two strongly curved surfaces of the lenses 12 and 14 face each other. The iris diaphragm 20 should be as close to lens 12 as possible, and care should be taken to assure that the diffuser B is in the focal plane of lens 12 and the detector 16 is in the focal plane of lens 14.

A bulk diffuser designed to yield a Gaussian intensity profile and an 8° energy half-angle in accordance with the invention has the following characteristics:

Diffuser thickness—3 mm.
Refractive index of substrate—1.49
Refractive index of spheres—1.508
Volume ratio—2%
Effective sphere diameter—8 μm.
5 μm. < sphere diameter < 25 μm.

Figure 1:
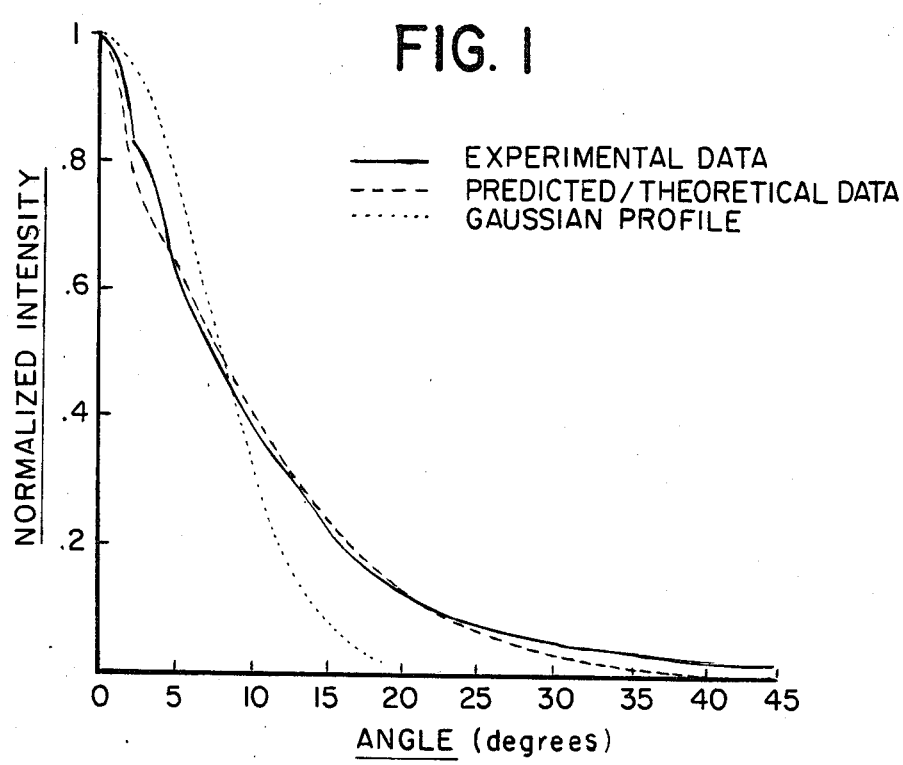
FIG. 1 is a plot of the intensity as a function of angle for a typical bulk diffuser.
Figure 4:
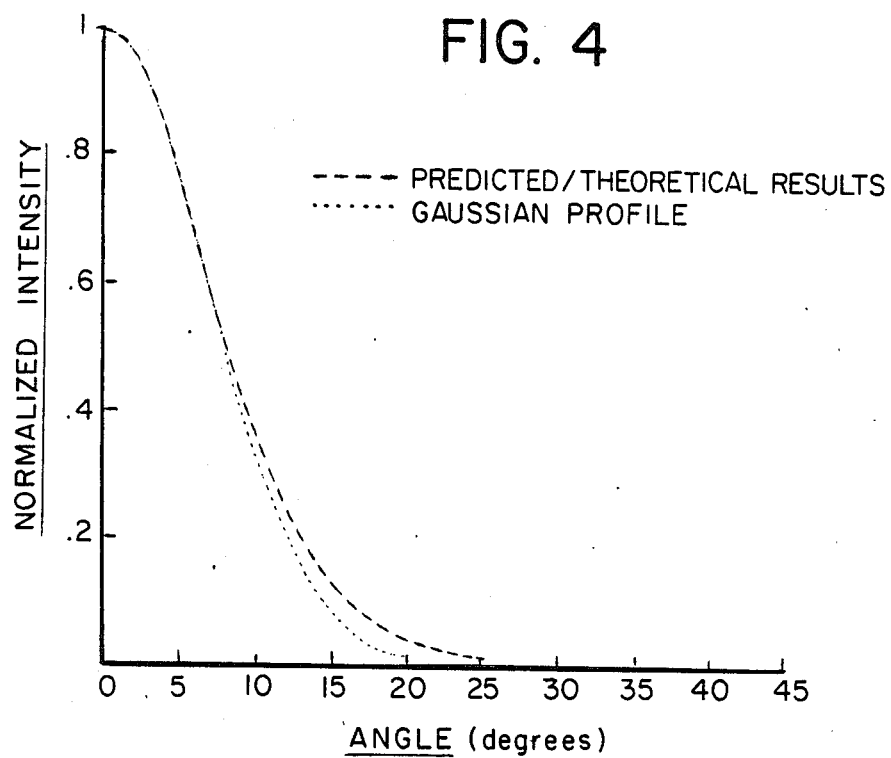
FIG. 4 is a plot of the intensity as a function of angle for a bulk diffuser selected in accordance with the method of the invention.

FIG. 4 is a plot of the predicted intensity profile and a Gaussian profile.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

What is claimed:

1. A bulk diffuser for a rear projection television screen comprising:
    a substrate having a first index of refraction; and
    a plurality of spheres dispersed through said substrate, said spheres having a second index of refraction which is different from said first index of refraction, a range of diameters of said spheres and a loading density of said spheres being chosen such that a resulting intensity half-angle and an energy half-angle are substantially equal whereby an intensity profile of said bulk diffuser is Gaussian.

2. A bulk diffuser as claimed in claim 1, wherein said second index of refraction is greater than said first index of refraction.

3. A bulk diffuser as claimed in claim 1, wherein for a given intensity and energy half-angle, said bulk diffuser has a thickness which is inversely proportional to said loading density of said spheres in said substrate.

4. A bulk diffuser as claimed in claim 1, wherein said intensity half-angle and said energy half-angle are equal to 8 degrees.

5. A bulk diffuser as claimed in claim 4, wherein said bulk diffuser has a thickness of 3 mm. and said loading density of said spheres is 2 percent.

6. A bulk diffuser as claimed in claim 5, wherein said range of diameters of said spheres is 5–25 μm.

7. A bulk diffuser as claimed in claim 6, wherein said first index of refraction is 1.49 and said second index of refraction is 1.508.

* * * * *